United States Patent
Agardh et al.

(10) Patent No.: US 12,363,638 B2
(45) Date of Patent: Jul. 15, 2025

(54) WAKE-UP TRANSMISSION ON A SEPARATE CARRIER

(71) Applicant: Sony Corporation, Tokyo (JP)

(72) Inventors: Kåre Agardh, Rydebäck (SE); Nafiseh Mazloum, Lund (SE); Rickard Ljung, Helsingborg (SE)

(73) Assignee: SONY CORPORATION, Tokyo (JP)

( * ) Notice: Subject to any disclaimer, the term of this patent is extended or adjusted under 35 U.S.C. 154(b) by 25 days.

(21) Appl. No.: 16/980,049

(22) PCT Filed: Mar. 4, 2019

(86) PCT No.: PCT/EP2019/055292
§ 371 (c)(1),
(2) Date: Sep. 11, 2020

(87) PCT Pub. No.: WO2019/174947
PCT Pub. Date: Sep. 19, 2019

(65) Prior Publication Data
US 2021/0022078 A1     Jan. 21, 2021

(30) Foreign Application Priority Data

Mar. 16, 2018 (SE) .................................. 1830085-5

(51) Int. Cl.
*H04W 52/02* (2009.01)
*H04W 48/02* (2009.01)
(Continued)

(52) U.S. Cl.
CPC ....... *H04W 52/0235* (2013.01); *H04W 48/02* (2013.01); *H04W 52/0216* (2013.01);
(Continued)

(58) Field of Classification Search
None
See application file for complete search history.

(56) References Cited

U.S. PATENT DOCUMENTS

| | | | |
|---|---|---|---|
| 6,920,342 B2 | 7/2005 | Reiner | |
| 2009/0258661 A1* | 10/2009 | Tsai | H04W 68/025 455/458 |

(Continued)

FOREIGN PATENT DOCUMENTS

| | | |
|---|---|---|
| CN | 107360619 A | 11/2017 |
| CN | 107431978 A | 12/2017 |

(Continued)

OTHER PUBLICATIONS

International Search Report and Written Opinion from corresponding International Application No. PCT/EP2019/055292, dated May 31, 2019, 16 pages.

(Continued)

*Primary Examiner* — James P Duffy
(74) *Attorney, Agent, or Firm* — Tucker Ellis LLP

(57) ABSTRACT

A method includes communicating, from an access node (111, 112) of a network (100) and to a terminal (101), a wake-up signal (4003) on a first carrier (280, 280-1) occupying a first frequency band (281); and in response to communicating the wake-up signal (4003): communicating at least one further signal (4002, 4004, 4005, 4050) on a second carrier (280-2) occupying a second frequency band (282). The first frequency band (281) is offset in frequency domain from the second frequency band (282).

21 Claims, 14 Drawing Sheets

(51) Int. Cl.
  *H04W 72/04*     (2009.01)
  *H04W 72/0453*   (2023.01)
  *H04W 76/28*     (2018.01)

(52) U.S. Cl.
  CPC ... *H04W 52/0277* (2013.01); *H04W 72/0453* (2013.01); *H04W 76/28* (2018.02)

(56) References Cited

U.S. PATENT DOCUMENTS

| | | | |
|---|---|---|---|
| 2010/0214969 A1 | 8/2010 | Lamm | |
| 2011/0269462 A1* | 11/2011 | Sagfors | H04W 36/36 455/436 |
| 2012/0214494 A1* | 8/2012 | Awoniyi | H04W 88/10 455/439 |
| 2015/0049741 A1* | 2/2015 | Chen | H04W 72/0453 370/336 |
| 2015/0189592 A1* | 7/2015 | Jafarian | H04W 52/0216 370/311 |
| 2015/0208348 A1 | 7/2015 | Kojima | |
| 2016/0128128 A1* | 5/2016 | Ang | H04W 76/28 370/311 |
| 2016/0270036 A1* | 9/2016 | Fröberg | H04L 5/0051 |
| 2016/0323823 A1* | 11/2016 | Ryoo | H04W 52/0216 |
| 2017/0164364 A1 | 6/2017 | Song | |
| 2017/0332327 A1 | 11/2017 | Fang | |
| 2018/0213512 A1* | 7/2018 | Ryu | H04L 5/001 |
| 2019/0110310 A1* | 4/2019 | Obregon | H04W 72/082 |
| 2021/0058863 A1* | 2/2021 | Kalhan | H04W 56/005 |

FOREIGN PATENT DOCUMENTS

| | | | |
|---|---|---|---|
| WO | WO-2008136714 A1 * | 11/2008 | ........ H04W 52/0216 |
| WO | 2009118012 A1 | 10/2009 | |
| WO | 2010035913 A1 | 4/2010 | |
| WO | 2017052596 A1 | 3/2017 | |

OTHER PUBLICATIONS

CATT, "UE Power Saving and Wakeup Mechanism"; 3GPP TSG RAN Meeting #78, RP-172373, Datang Telecom Technology & Industry Group, Dec. 18-21, 2017, 14 pages.

Miagno, Michele et al., "An Ultra Low Power High Sensitivity Wake-up Radio Receiver with Addressing Capability", IEEE, The Second International Workshop on Green Optimized Wireless Networks, copyright 2014, pp. 92-99.

CATT, "UE Wakeup Mechanism and On-Demand Access for fNB-IoT UE Power Saving," 3GPP TSG RAN WG1 Meeting #89, R1-1707456, May 15-19, 2017, 4 pages.

Ericsson, "Wake-up signal configurations and procedures for NB-IoT", 3GPP TSG-RAN WG#1 Meeting #92 R1-1801489, Feb. 26-Mar. 2, 2018, Athens, Greece.

* cited by examiner

WAKE-UP TRANSMISSION ON A SEPARATE CARRIER

TECHNICAL FIELD

Various embodiments of the invention generally relate to wake-up signal transmission.

BACKGROUND

Wireless communication is an integral part of modern life. Reducing energy consumption of wireless communication is an important task to enable various applications such as Internet of Things (IOT) or Machine Type Communication (MTC).

One approach to reduce the energy consumption of wireless communication is to use wake-up techniques. Wake-up techniques are designed to achieve a lower energy consumption if compared to legacy paging techniques. This is achieved by using tailored wake-up signals (WUSs). A WUS can have a sequence design that enables energy-efficient reception. For example, a terminal/user equipment (UE) may include two receivers, i.e., one main receiver and a low-power receiver. The low-power receiver may implement a comparably simple architecture and, therefore, may consume less power during operation than the main receiver. The low-power receiver can be activated when the main receiver has transitioned into an inactive state. Then, the low-power receiver can receive the WUS and, in response to receiving the WUS, the main receiver can transition again to the active state. Payload data may be transmitted and/or received (communicated) by the main receiver.

Example implementations are described by Third Generation Partnership Project (3GPP) TSG RAN Meeting #74 contribution RP-162286 "Motivation for New WI on Even further enhanced MTC for LTE"; 3GPP TSG RAN Meeting #74 contribution RP-162126 "Enhancements for Rel-15 eMTC/NB-IoT"; and 3GPP TSG RAN WG1 #88 R1-1703139 "Wake Up Radio for NR". See 3GPP TSG RAN WG2 #99 R2-1708285.

SUMMARY

A need exists for advanced techniques of WUS transmission.

This need is met by the features of the independent claims. The features of the dependent claims define embodiments.

A method includes communicating a WUS from an access node of a network to a UE. The WUS is communicated on a first carrier. The first carrier occupies a first frequency band. The method also includes communicating at least one further signal, in response to communicating the WUS. The at least one further signal is communicated on a second carrier which occupies a second frequency band. The first frequency band is offset in frequency domain from the second frequency band.

A computer program or a computer program product includes program code. The program code can be executed by at least one processor. When executing the program code, the at least one processor is configured to perform a method. The method includes communicating a WUS from an access node of a network to a UE. The WUS is communicated on a first carrier. The first carrier occupies a first frequency band. The method also includes communicating at least one further signal, in response to communicating the WUS. The at least one further signal is communicated on a second carrier which occupies a second frequency band. The first frequency band is offset in frequency domain from the second frequency band.

A device is configured to communicate a WUS from an access node of a network to a UE. The WUS is communicated on a first carrier. The first carrier occupies a first frequency band. The device is also configured to communicate at least one further signal, in response to communicating the WUS. The at least one further signal is communicated on a second carrier which occupies a second frequency band. The first frequency band is offset in frequency domain from the second frequency band. For example, the device may include control circuitry which is configured to perform the above-identified acts.

For example, the device may be the access node or the UE.

An access node of a network is configured to transmit a WUS to a UE. The WUS is transmitted on a first carrier. The first carrier occupies a first frequency band. The access node is also configured to communicate at least one further signal, in response to transmitting the WUS. The at least one further signal is communicated on a second carrier which occupies a second frequency band. The first frequency band is offset in frequency domain from the second frequency band. For example, the access node may include control circuitry which is configured to perform the above-identified acts.

An UE is configured to receive a WUS from an access node of a network. The WUS is received on a first carrier. The first carrier occupies a first frequency band. The UE is also configured to communicate at least one further signal, in response to receiving the WUS. The at least one further signal is communicated on a second carrier which occupies a second frequency band. The first frequency band is offset in frequency domain from the second frequency band. For example, the UE may include control circuitry which is configured to perform the above-identified acts.

A method includes allocating a first plurality of UEs to WUS transmission on a first carrier. The method also includes allocating a second plurality of UEs to WUS transmission on a second carrier. A first frequency band occupied by the first carrier is offset in frequency domain from a second frequency band which is occupied by the second carrier.

A computer program or a computer program product includes program code. The program code can be executed by at least one processor. When executing the program code, the at least one processor is configured to perform a method. The method includes allocating a first plurality of UEs to WUS transmission on a first carrier. The method also includes allocating a second plurality of UEs to WUS transmission on a second carrier. A first frequency band occupied by the first carrier is offset in frequency domain from a second frequency band which is occupied by the second carrier.

A device—e.g., a base station or a scheduling node of a network—is configured allocate a first plurality of UEs to WUS transmission on a first carrier. The device is further configured to allocate a second plurality of UEs to WUS transmission on a second carrier. A first frequency band occupied by the first carrier is offset in frequency domain from a second frequency band which is occupied by the second carrier. For example, the device may include control circuitry which is configured to perform the above-identified acts.

DETAILED DESCRIPTION OF EMBODIMENTS

Figure 1:
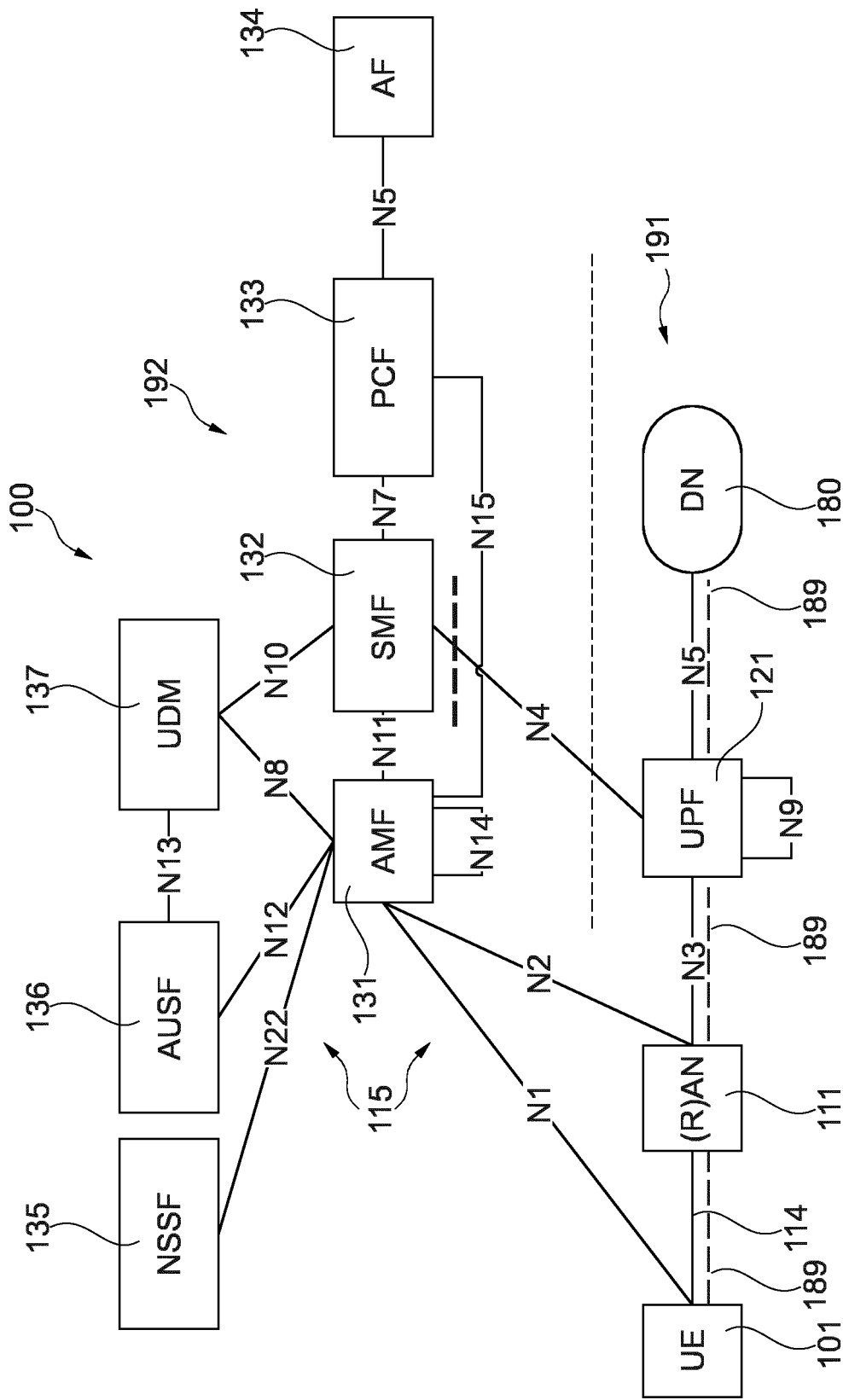
FIG. 1 schematically illustrates a network according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wirelessly communicating using a communication network are described. The communication network may be a wireless network. For sake of simplicity, various scenarios are described hereinafter with respect to an implementation of the communication network by a cellular network. The cellular network includes multiple cells. Each cell corresponds to a respective sub-area of the overall coverage area. Other example implementations include Institute of Electrical and Electronics Engineers (IEEE) WLAN network, MulteFire (see Qualcomm, "MulteFire: LTE-like performance with Wi-Fi-like deployment simplicity." https://www.qualcomm.com/invention/technologies/lte/multefire, 2016), etc.

Hereinafter, WUS techniques are described. The WUS techniques enable a UE to transition a main receiver of a UE into a low-power state, e.g., for power-saving purposes. In some examples, the low-power state of the main receiver may be an inactive state. For example, the WUS may be received by a dedicated low-power receiver of the UE. In other examples, the WUS may be received by the main receiver in the low-power state. Here, it may not be required to provision a dedicated low-power receiver. The low-power receiver and main receiver may be implemented within the same hardware component(s) or may be implemented by at least one different hardware component.

Reference wake-up techniques face certain restrictions and drawbacks. For example, scenarios are conceivable in which a carrier for data transmission has limited resources available for WUS transmission. For example, this may be applicable for communication on unlicensed bands at low frequencies, e.g., below 1 GHz. Here, the spectrum may be subject to access restrictions which limit the overall available capacity. Further, the bandwidth can be limited. Then, allocating additional time-frequency resources to the WUS transmission can be challenging.

On the other hand, accommodating WUS transmission on carriers at higher frequencies, e.g., in the range of 1 GHz-5 GHz, can also be challenging. Typically, the sequence design of WUSs—e.g., in terms of modulation and coding scheme, duration, etc.—is significantly different for WUS transmission if compared to data transmission at such high frequencies. Typically, the complexity of the modulation and coding scheme—e.g., in terms of the rank of the applied constellation, etc.—is significantly lower for the WUS transmission than for the data transmission. Then, for the WUS transmission at high frequencies, coupling loss due to attenuation on the wireless link can be significant.

The inactive state can be characterized by a significantly reduced power consumption if compared to an active state of the main receiver. For example, the main receiver may be unfit to receive any data in the inactive state such that some or all components may be shut down. Wake-up of the main receiver from the inactive state is then triggered by a WUS. As a general rule, the inactive state can be associated with various operational modes of the UE, e.g., a disconnected mode or idle mode; but in some scenarios also a connected mode. Sometimes, the operational mode of the UE associated with WUS communication is referred to as WUS mode. As a general rule, there may be multiple WUS modes available, e.g., modes in which the UE is registered at the network as connected or idle, etc.

Communication of the WUS may be time-aligned with a discontinuous reception (DRX) cycle of the UE. General techniques of DRX are, for example, described in 3GPP TS 36.331, Version 14.0.0, and 3GPP 36.304 Version 14.0.0.

The WUS may have a comparably simple modulation, e.g., On-Off Keying or the like, which facilitates a simple time-domain operation by the low-power receiver. For example, non-coherent decoding may be possible. For non-coherent decoding, knowledge of a reference phase is not required for signal detection. The WUS may help to avoid blind decoding of a control channel on which paging signals and/or paging messages are communicated. Since typically such blind decoding is comparably energy inefficient, thereby, power consumption can be reduced by using WUSs.

Various techniques are based on the finding that WUS transmission, according to reference implementations, is often limited in flexibility due to the need to allocate the WUS transmission to a frequency band also used for data transmission. For example, at high frequencies—e.g. above 1 GHz—, this can limit the flexibility to use a low-complexity sequence design for WUSs, e.g., in view of coupling loss due to attenuation on the wireless link. On the other hand, at low frequencies—e.g., below 1 GHz—, it has been observed that limitations in the available resources can require certain compromises for the WUS transmission, as well. Further, including, both, the WUS transmission, as well as the data transmission in a common frequency band on an unlicensed spectrum (sometimes also referred to as shared or lightly licensed spectrum) can require compromises for the WUS transmission in view of the access regulations associated with the unlicensed spectrum.

Generally, to facilitate efficient spectrum usage and high data rates, wireless communication on an unlicensed spectrum is possible. Multiple operators or networks may share access to the unlicensed spectrum. In other words, access to the unlicensed spectrum may not be restricted to a single operator or network. Typically, the wireless communication on the unlicensed spectrum may involve procedures and limitations due to the possibility of multiple networks sharing the same spectrum. Such techniques may include clear channel assessment techniques, e.g. Carrier Sense Multiple Access/Collision Avoidance (CSMA/CA). Other techniques to ensure that multiple networks can share the same spectrum may include channel access regulations. Such channel access regulations may include, but are not limited to limitations on maximum percentage of transmissions per time unit (maximum channel access duty cycle), limitations on maximum transmission output power, limitations on the minimum power spectral density, and limitations on the maximum channel occupancy time per transmission. The required techniques may differ depending on channel access regulations for the unlicensed spectrum, and the requirements may be different depending on the specific frequency spectrum as well as the geographic location of the device. This is captured by the specific channel access regulations.

According to the techniques described herein, it is possible to separate WUS transmission and data transmission in frequency domain. For example, a WUS can be communicated from an access node to a UE on a first carrier which occupies a first frequency band. Then, at least one further signal can be communicated on a second carrier which occupies a second frequency band. Communication of the at least one further signal can be in response to communicating the WUS. The first frequency band can be offset and frequency domain from the second frequency band.

Hereinafter, for sake of simplicity, implementations are described in which the WUSs are transmitted by the BS. Generally, the WUSs may be transmitted by other kinds and types of access nodes, such as access points etc. Also WUS transmission on a sidelink or device-to-device channels is conceivable.

The WUSs can be communicated in downlink (DL). As a general rule, the at least one further signal communicated in response to the WUS can be communicated on at least one of DL and uplink (UL).

By using two carriers, one for the WUS transmission and one for the transmission of the at least one further signal, it becomes possible to implement the WUS transmission in a separate communication system, i.e., a communication system which is separated from the remaining transmission, e.g., paging signal transmission, control data transmission, and/or payload data transmission.

Thereby, a flexibility for the WUS transmission is increased. Specifically, the limitations imposed on the WUS transmission—e.g., in terms of the sequence design, resource allocation, etc.—can be mitigated by using separate carriers and, optionally, separate communication systems.

For example, the second frequency band may be at lower frequencies if compared to the first frequency band. Further the second frequency band may have a smaller allocated bandwidth, or allow transmissions with a smaller transmission bandwidth. For example, the second frequency band may have access regulations limiting the transmission to comparably small bandwidths, e.g., in the range of 200 kHz up to 500 kHz.

As a general rule, it would be possible that the first frequency band is on an unlicensed spectrum. Alternatively or additionally, the second frequency band may be on an unlicensed spectrum.

For example, it is expected that several open spectra are available at frequencies of less than 1 GHz. Here, access regulations are expected, e.g., in terms of the threshold channel access duty cycle.

FIG. 1 schematically illustrates a cellular network 100. The example of FIG. 1 illustrates the network 100 according to the 3GPP 5G architecture. Details of the fundamental architecture are described in 3GPP TS 23.501, version 1.3.0 (2017 September). While FIG. 1 and further parts of the following description illustrate techniques in the 3GPP 5G framework, similar techniques may be readily applied to different communication protocols. Examples include 3GPP LTE 4G and IEEE Wi-Fi technology.

In the scenario of FIG. 1, a UE 101 is connectable to the network 100. For example, the UE 101 may be one of the following: a cellular phone; a smart phone; an IOT device; a MTC device; a sensor; an actuator; etc.

The UE 101 is connectable to the network 100 via a radio access network (RAN) 111, typically formed by one or more BSs (not illustrated in FIG. 1). A wireless link 114 is established between the RAN 111—specifically between one or more of the BSs of the RAN 111—and the UE 101.

The wireless link 114 may be implemented on a carrier. The carrier may include a number of sub-carriers. The wireless link 114 and, as such the carrier, may be associated with a communication system. For example, the communication system may be identified by a system identification registered to transmission on the carrier. The system identification may be a unique identity of the communication system. Thereby, different operators may co-deploy communication systems in the same spatial area; different UEs can selectively use different communication systems based on the system identification.

The RAN 111 is connected to a core network (CN) 115. The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data network 180, e.g., the Internet or a Local Area Network. Application data can be communicated between the UE 101 and one or more servers on the data network 180.

The network 100 also includes an Access and Mobility Management Function (AMF) 131; a Session Management Function (SMF) 132; a Policy Control Function (PCF) 133; an Application Function (AF) 134; a Network Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: registration management; non-access stratum (NAS) termination; connection management; reachability management; mobility management; access authentication; and access authorization the AMF 131 can negotiate an NAS-level security context with the UE 101. See 3GPP TS 23.501 version 1.3.0 (2017 September), section 6.2.1. For example, the AMF 131 controls CN-initiated wake-up and/or paging of the UEs 101: The AMF 131 may trigger transmission of WUS and/or paging signals of the UE 101. The AMF 131 may keep track of the timing of a DRX cycle of the UE 101.

A data connection 189 is established by the AMF 131 if the respective UE 101 operates in a connected mode. To keep track of the current mode of the UEs 101, the AMF 131 sets the UE 101 to evolved packet system (EPS) connection management (ECM) connected or ECM idle. During ECM connected, a NAS connection is maintained between the UE 101 and the AMF 131. The NAS connection implements an example of a mobility control connection. The NAS connection may be set up in response to wake-up and/or paging of the UE 101, using a random access (RA) transmission.

The data connection 189 is established between the UE 101 via the RAN 111 and the DP 191 of the CN 115 and towards the DN 180. For example, a connection with the Internet or another packet data network can be established. A server of the DN 180 may host a service for which payload data is communicated via the data connection 189. The data connection 189 may include one or more bearers such as a dedicated bearer or a default bearer. The data connection 189 may be defined on the Radio Resource Control (RRC) layer, e.g., generally Layer 3 of the OSI model of Layer 2.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc.

As such, the AMF 131 and the SMF 132 both implement CP mobility management needed to support a moving UE.

Figure 2:
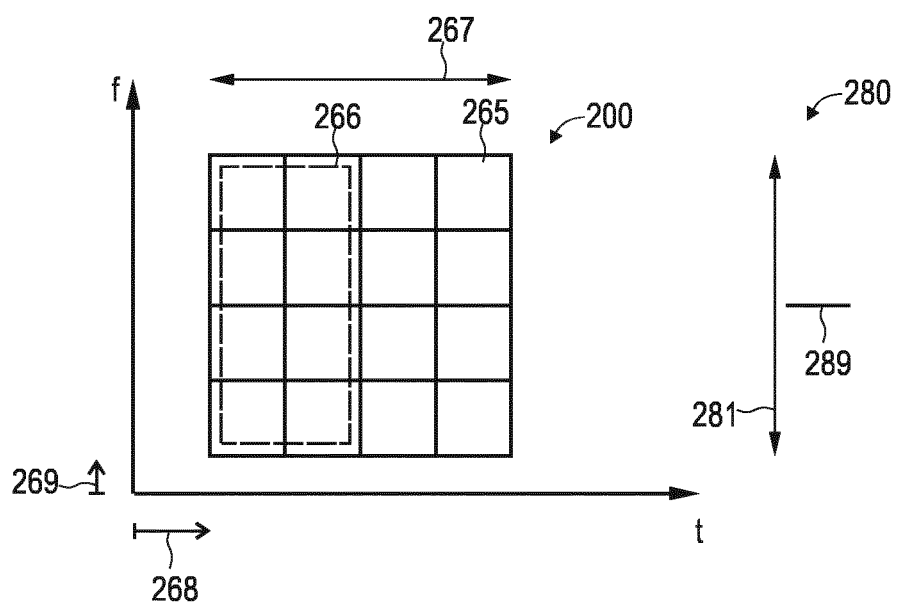
FIG. 2 schematically illustrates a time-frequency resource grid of a carrier according to various examples.

FIG. 2 illustrates aspects with respect to a carrier 280. The carrier 280 has a center frequency 289 and a bandwidth 281. The carrier 280 defines a time-frequency resource grid 200.

Generally, the carrier is a waveform—e.g., a periodic waveform such as a sinusoid waveform—that is modulated based on an input signal for conveying information. The center frequency 289 of the carrier is referred to as carrier frequency which is higher than the frequency of the input signal, sometimes referred to as baseband frequency. Different carriers occupying different frequency bands can be communicated with limited interference, based on the concept of frequency division duplex (FDD). Often, different carriers 280 are associated with different communication systems. Different carriers may or may not be served by the same BS.

FIG. 2 also illustrates aspects with respect to the time-frequency resource grid 200. The time-frequency resource grid 200 includes multiple time-frequency resources 265. In the scenario of FIG. 2, the carrier 280 includes multiple sub-carriers, defining the frequency-domain spacing of the time-frequency resources 265; albeit this is generally optional. For example, for an Orthogonal Frequency Division Multiplex (OFDM) modulation, multiple sub-carriers may be defined by the carrier 280. As time progresses, the carrier 280 encodes different data. The atomic time-frequency resources 265 is sometimes referred to as resource element. A resource element can be defined by the symbol duration in time domain and/or a subcarrier or a carrier width in frequency domain.

As illustrated in FIG. 2, the time-frequency resource grid 200 is defined in time domain and frequency domain with respect to a timing reference and frequency reference, respectively. A respective time offset 268 with respect to an arbitrary time origin of the timing reference and a frequency offset 269 with respect to an arbitrary frequency origin of the frequency reference are illustrated. Typically, to enable successful demodulation and decoding of data encoded by the symbols included in the resource elements 265, synchronization between transmitter and receiver is required. When synchronizing, the timing reference and the frequency reference are acquired based on synchronization signals.

Sometimes, multiple resource elements 265 are grouped into resource groups 266. Resource groups 266 can be helpful for scheduling purposes, to limit a control signaling overhead by not having to address individual resource elements 265.

Further, transmission on the wireless link 114 can be structured in time domain by using transmission frames 267. Transmission frames 267 have certain duration and include a certain number of resource elements 265 and resource groups 266. Repetitive allocation of resource elements 265 resource groups 266 to certain channels becomes possible by using the transmission frames 267. Typically, transmission frames 267 are labelled using sequence numbers that are signaled on resource elements 265 in a header of the transmission frames 267.

Figure 3:
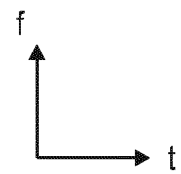
FIG. 3 schematically illustrates resources allocated to various channels according to various examples.

FIG. 3 illustrates aspects with respect to channels 261-263 implemented on the wireless link 114. The wireless link 114 implements a plurality of communication channels 261-263.

Each channel 261-263 may be allocated to one or more resource elements 265 or resource groups 265.

For example, a first channel 261 may carry reference signals, e.g., channel sounding reference signals and/or synchronization signals for acquiring the timing and frequency reference.

A second channel 262 may carry paging signals or paging indicators which enable the network 100—e.g., the AMF 131 (or a MME in the 3GPP LTE framework)—to page the UE 101 when the UE 101. The paging signals or paging indicators may thus be communicated in dedicated resources of the channel 262. Typically, the paging indicators are communicated on PDCCH.

Further, a third channel 263 is associated with a payload signal encoding payload data. For example, payload messages carrying higher-layer user-plane data packets associated with a given service implemented by the UE 101 and the BS can be communicated on such a payload channel 263. User-data messages may be transmitted via the payload channel 263. Alternatively, Layer 3 or RRC control messages may be transmitted via the payload channel 263, e.g., a paging message. Also, scheduling control signals—e.g., DL control information (DCI)—can be communicated via the payload channel 263.

Figure 4:
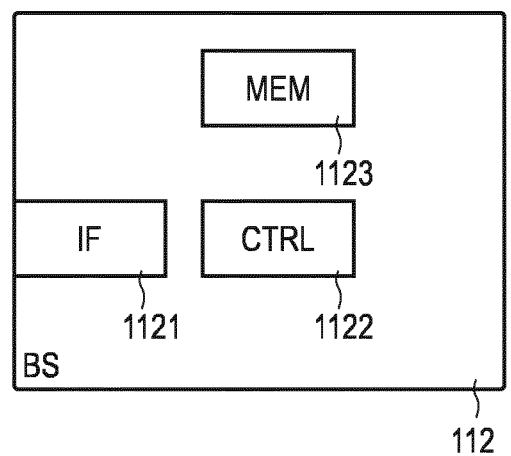
FIG. 4 schematically illustrates a base station (BS) according to various examples.

FIG. 4 schematically illustrates a BS 112 of the RAN 111 (cf. FIG. 1). The BS 112 includes an interface 1121. For example, the interface 1121 may include an analog front end and a digital front end. The BS 112 further includes control circuitry 1122, e.g., implemented by means of one or more processors and software. For example, program code to be executed by the control circuitry 1122 may be stored in a non-volatile memory 1123. In the various examples disclosed herein, various functionality may be implemented by the control circuitry 1122, e.g.: transmitting a WUS, e.g., on a first carrier; transmitting further signals, e.g., on a second carrier; etc.

Figure 5:
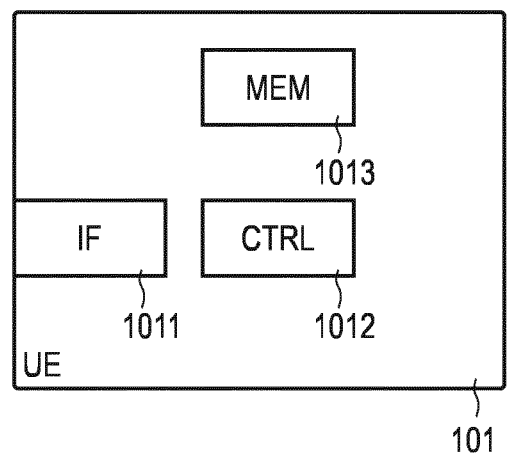
FIG. 5 schematically illustrates a UE according to various examples.

FIG. 5 schematically illustrates the UE 101. The UE 101 includes an interface 1011. For example, the interface 1011 may include an analog front end and a digital front end. In some examples, the interface 1011 may include a main receiver and a low-power receiver. Each one of the main receiver and the low-power receiver may include an analog front end and a digital front end, respectively. The UE 101 further includes control circuitry 1012, e.g., implemented by means of one or more processors and software. The control circuitry 1012 may also be at least partly implemented in hardware. For example, program code to be executed by the control circuitry 1012 may be stored in a non-volatile memory 1013. In the various examples disclosed herein, various functionality may be implemented by the control circuitry 1012, e.g.: receiving a WUS, e.g., on a first carrier; receiving further signals, e.g., on a second carrier.

Figure 6:
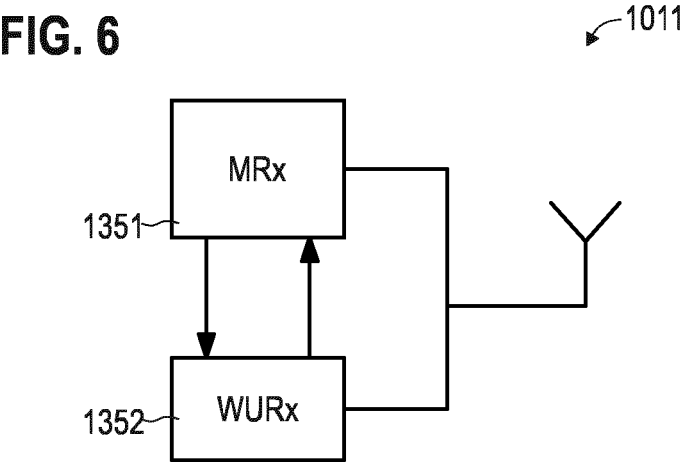
FIG. 6 schematically illustrates receivers of a UE for WUS transmission according to various examples.

FIG. 6 illustrates details with respect to the interface 1011 of the UE 101. In particular, FIG. 6 illustrates aspects with respect to a main receiver 1351 and a low-power receiver 1352. In FIG. 6, the main receiver 1351 and the low-power receiver 1352 are implemented as separate entities. For example, they may be implemented on different chips. For example, they may be implemented in different housings. For example, they may not share a common power supply.

The scenario FIG. 6 may enable switching off some or all components of the main receiver 1351 when operating the main receiver in inactive state. In the various examples described herein, it may then be possible to receive WUSs using the low-power receiver 1352. Also, the low-power receiver 1352 may be switched between an inactive state and an active state, e.g., according to a DRX cycle.

For example, if the main receiver 1351 is switched on, the low-power receiver 1352 may be switched off, and vice-versa. As such, the main receiver 1351 and the low-power receiver 1352 may be inter-related in operation (indicated by the arrows in FIG. 6).

Figure 7:
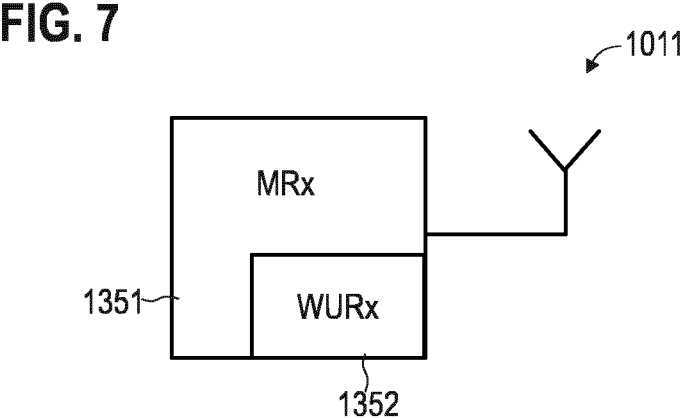
FIG. 7 schematically illustrates receivers of a UE for WUS transmission according to various examples.

FIG. 7 illustrates details with respect to the interface 1011 of the UE 101. In particular, FIG. 7 illustrates aspects with respect to the main receiver 1351 and the low-power receiver 1352. In FIG. 7, the main receiver 1351 and the low-power receiver 1352 are implemented as a common entity. For example, they may be implemented on the common chip, i.e., integrated on a common die. For example, they may be implemented in a common housing. For example, they may share a common power supply or other units.

The scenario FIG. 7 may enable a particular low latency for transitioning between reception—e.g., of a WUS—by the wake-up receiver 1352 and reception by the main receiver 1351.

While in FIGS. 6 and 7 a scenario is illustrated where the main receiver 1351 and the low-power receiver 1352 share a common antenna, in other examples, it would be also possible that the interface 1011 includes dedicated antennas for the main receiver 1351 and the low-power receiver 1352.

While in the examples of FIGS. 6 and 7 scenarios are illustrated where there is a dedicated low-power receiver 1352, in other examples there may be no low-power receiver. Instead, the WUS may be received by the main receiver 1351 in a low-power state. For example, the main receiver 1351 may not be fit to receive ordinary data other than the WUS in the low-power state. Then, in response to receiving the WUS, the main receiver 1351 may transition into a high-power state in which it is fit to receive the ordinary data, e.g., on channel 263, etc.

Figure 8:
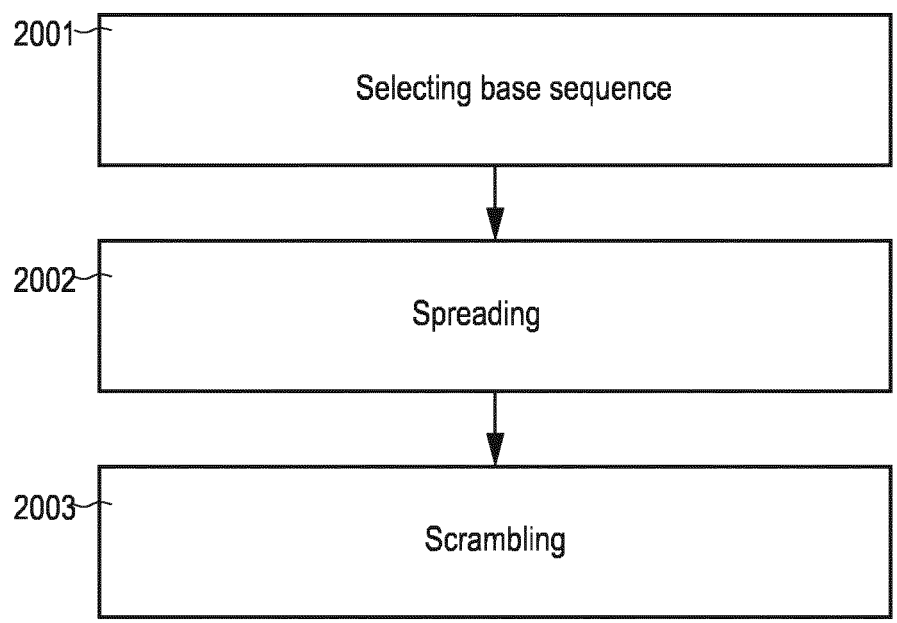
FIG. 8 is a flowchart of a method of generating a WUS according to various examples.

FIG. 8 is a flowchart of a method according to various examples. FIG. 8 illustrates aspects with respect to constructing or generating the WUS.

For example, the method according to FIG. 8 could be executed by the control circuitry 1122 of the BS 112. FIG. 8 illustrates aspects with respect to a sequence design of the WUS. In the various examples described herein, it may be possible to construct the WUSs according to the method of FIG. 8.

First, a certain base sequence is selected, 2001. For example the base sequence may be a randomly generated set of bits. For example the base sequence may be unique for a UE or a group of UEs. For example, the base sequence may be unique for a cell of the network 100. For example, the base sequence may be selected from the group including: a Zadoff-Chu sequence; a sequence selected from a set of orthogonal or quasi-orthogonal sequences; and a Walsh-Hadamard sequence. For example, selecting the particular base sequence or type of base sequence can be subject to sequence design of the WUS. For example, setting the sequence length of the base sequence of the WUS can be subject to sequence design of the WUS. Selecting the base sequence can be subject to sequence design of the WUS.

In some examples, different base sequences may be selected for different WUSs. In particular, the base sequence may be selected based on an intended recipient of the WUS, i.e., depending on the particular UE 101 to which the WUS is to be transmitted. In other words, it may be possible that the base sequence is uniquely associated with the respective UE 101 as the intended recipient of the WUS. Different UEs may be addressed by different base sequences. Hence, the base sequence may also be referred to as identity code. Thereby, it may be possible to implement the WUS to be UE-related.

Next, spreading may be applied to the base sequence, 2002. When spreading a bit sequence, the incoming bit sequence is spread/multiplied with a spreading sequence. This increases the length of the incoming bit sequence by a spreading factor K. The resulting bit sequence can be of the same length as the incoming bit sequence times the spreading factor. Details of the spreading can be set by a spreading parameter. For example, the spreading parameter may specify the spreading sequence, e.g., a length of the spreading sequence or individual bits of the spreading sequence. Setting the spreading parameter can be subject to sequence design of the WUS.

Then, scrambling may be applied to the spread base sequence, 2003. Scrambling may relate to inter-changing or transposing a sequence of the bits of the incoming bit sequence according to one or more rules. Scrambling provides for randomization of the incoming bit sequence. Based on a scrambling code, the original bit sequence can be reproduced at the receiver. Details of the scrambling can be set by a scrambling parameter. For example, the scrambling parameter can identify the one or more rules. For example, the scrambling parameter can relate to the scrambling code. Setting the scrambling parameter can be subject to sequence design of the WUS.

In some examples, it may be possible to additionally add a checksum to the WUS. Adding a checksum may be subject to sequence design of the WUS. For example, a checksum protection parameter may set whether to include or to not include the checksum. For example, the checksum protection parameter may set a length of the checksum. For example, the checksum protection parameter may set a type of the checksum, e.g., according to different error-correction algorithms, etc. The checksum may provide for joint error detection and, optionally, correction capability across the entire length of the WUS, i.e., across multiple parts of the WUS.

In some examples, it may be possible to add a preamble to the WUS. The preamble may include a sequence of preamble bits. For example, the sequence of preamble bits may have a specific length. The sequence of preamble bits may enable robust identification of the WUS, e.g., even in presence of burst errors, etc. Presence of the preamble, length of the preamble, and/or type of the preamble sequence, etc. can be properties that can be set according to a preamble parameter in sequence design of the WUS.

In the various examples described herein, the sequence design may differ for different carriers to which WUS transmission is allocated. Thereby, the WUS transmission can be tailored to the particular framework imposed by the specific carrier, e.g., access regulations, frequency band, path loss, etc.

Figure 9:
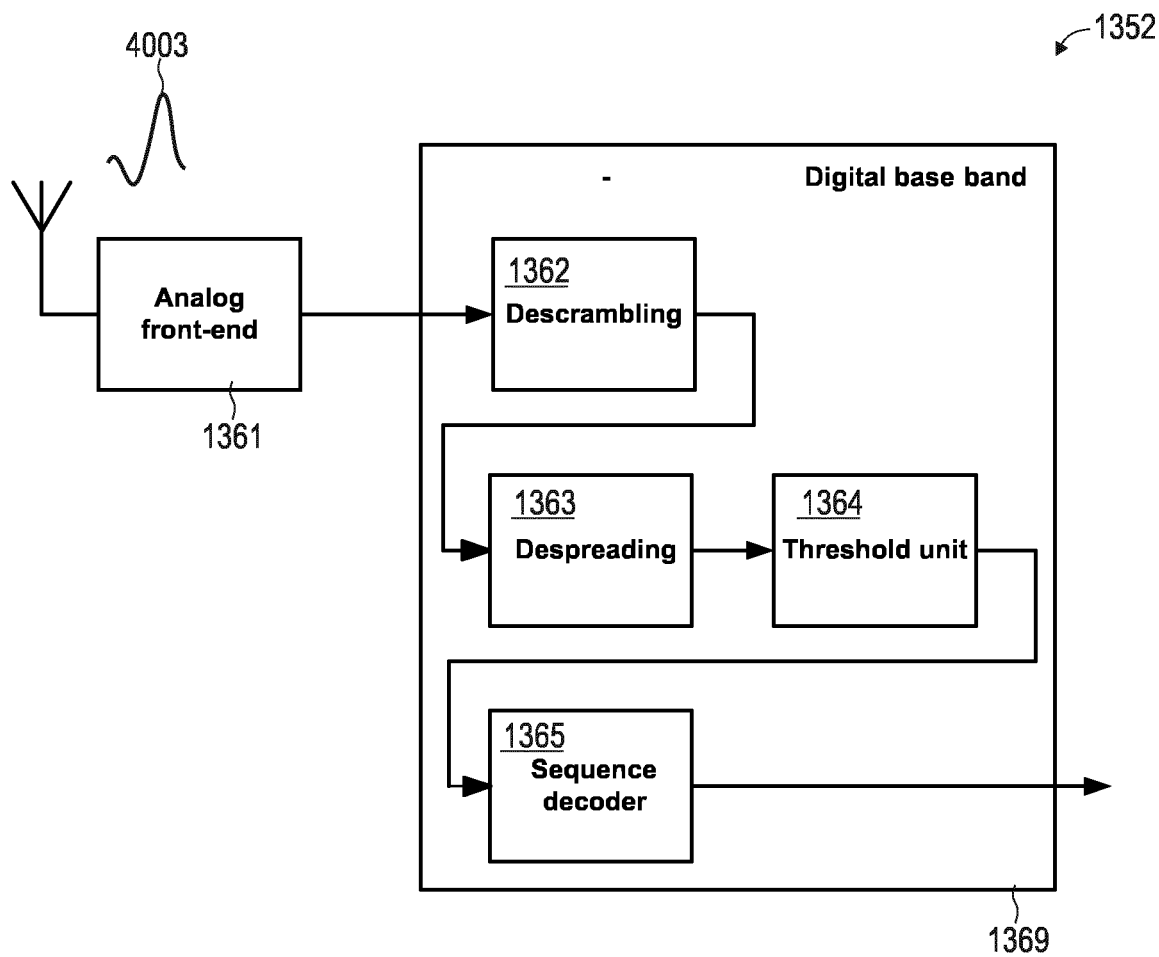
FIG. 9 schematically illustrates receiving a WUS according to various examples.

FIG. 9 illustrates aspects with respect to the processing of a WUS 4003 received by the low-power receiver 1352. The analog front end 1361 outputs a bit sequence corresponding to the WUS 4003 in the baseband to the digital front end 1369.

Generally, the various processing blocks indicated in FIG. 9—and, as such, also the inter-related processing blocks at the transmitter, cf. FIG. 8—are optional.

There may be provided a symbol-level buffer at the analog front end 1351. Then, based on a demodulator, a symbol sequence in the buffer may be transformed to a bit sequence. This may mark the transition from symbol level to bit level. Bit level processing is then handled in digital domain by the digital front end.

For example, each symbol may encode one or more bits. The symbol may be defined by an amplitude and phase of the received signal, often represented in complex space. The number of bits per symbol may depend on the used modulation scheme.

Sometimes, the number of bits per symbol is referred to as bit loading. The bit loading may depend on the used constellation.

In the various examples described herein, time-domain and/or frequency-domain processing is employed to identify the WUS 4003. Sometimes, respective processing may be with respect to a symbol sequence. Alternatively or additionally, respective processing may be with respect to a bit sequence. For example, processing may be with respect to a symbol sequence if the processing—e.g., correlation—is at the Fast Fourier Transform (FFT) output of the receiver. For example, processing may be with respect to a bit sequence if the processing—e.g., correlation—is after the demodulation output, e.g., after M-QAM or PSK output.

The processing of the WUS by the digital front end 1369 may be comparably simple—e.g., if compared to processing of a paging indicator. In legacy LTE, once the UE is scheduled a PO, i.e., allocated to listen to a paging indicator, the UE is expected to be ready to decode a physical DL control channel (PDCCH). Thus, the paging signal may include a temporary identity such as the P-RNTI and a PDCCH checksum which is scrambled with P-RNTI. The paging indicator may be transmitted on the PDCCH. The PDCCH computation can be energy consuming, especially in MTC.

Differently, the WUS may be transmitted independent of the PDCCH. The WUS may be transmitted prior to the UE accessing the PDCCH. Once the UE has detected a WUS that is assigned to that UE, then the UE may start to decode the PDCCH. For example, the WUS may be transmitted on a different carrier than the PDCCH.

The WUS may not include reference to the P-RNTI—included in the paging signal—for UE-specific identification. The WUS may be designed so that it requires less UE computation/calculation than reception and decoding of the paging signal.

For example, with respect to the WUS, it may not be preferred to have channel coding such as turbo code, convolutional code, etc. The WUS can be a robust signal, such that it does not operate with higher order modulation. It can be a lower order modulation, such as On-Of-Keying (OOK), BPSK. The WUS may employ a modulation scheme that has low peak to average power ratio property. The WUS, specifically a part of the WUS related to a UE, can be a random bits and/or sequence signal that can be unique that can be assigned to a UE or group of UEs.

De-scrambling functionality 1362 then performs de-scrambling.

Next, de-spreading functionality 1363 is applied.

A threshold unit 1364 is provided next.

A sequence decoder 1365 employs a decoding algorithm to the bit sequence. Finally, the base sequence employed at the transmitter is thus reassembled.

It is then possible to perform a cross-correlation between the base sequence and a reference sequence. If the cross correlation yields a significant result, it can be judged that the WUS 4003 was addressed to the particular UE 101 and possibly further UEs. Based on said cross correlating, it is then possible to selectively transition the main receiver 1351 from an inactive state to an active state.

By means of spreading and/or scrambling of the base sequence, more reliable cross correlation can be performed. For example, by spreading the base sequence, a longer sequence is obtained for the WUS 4003 transmitted over the air. Longer sequences generally are more robust to false positives when performing the cross correlation.

In some examples, different processing may be employed for WUSs received in different cells. The processing may be set in accordance with sequence design configurations indicated by configuration data for multiple cells.

Figure 10:
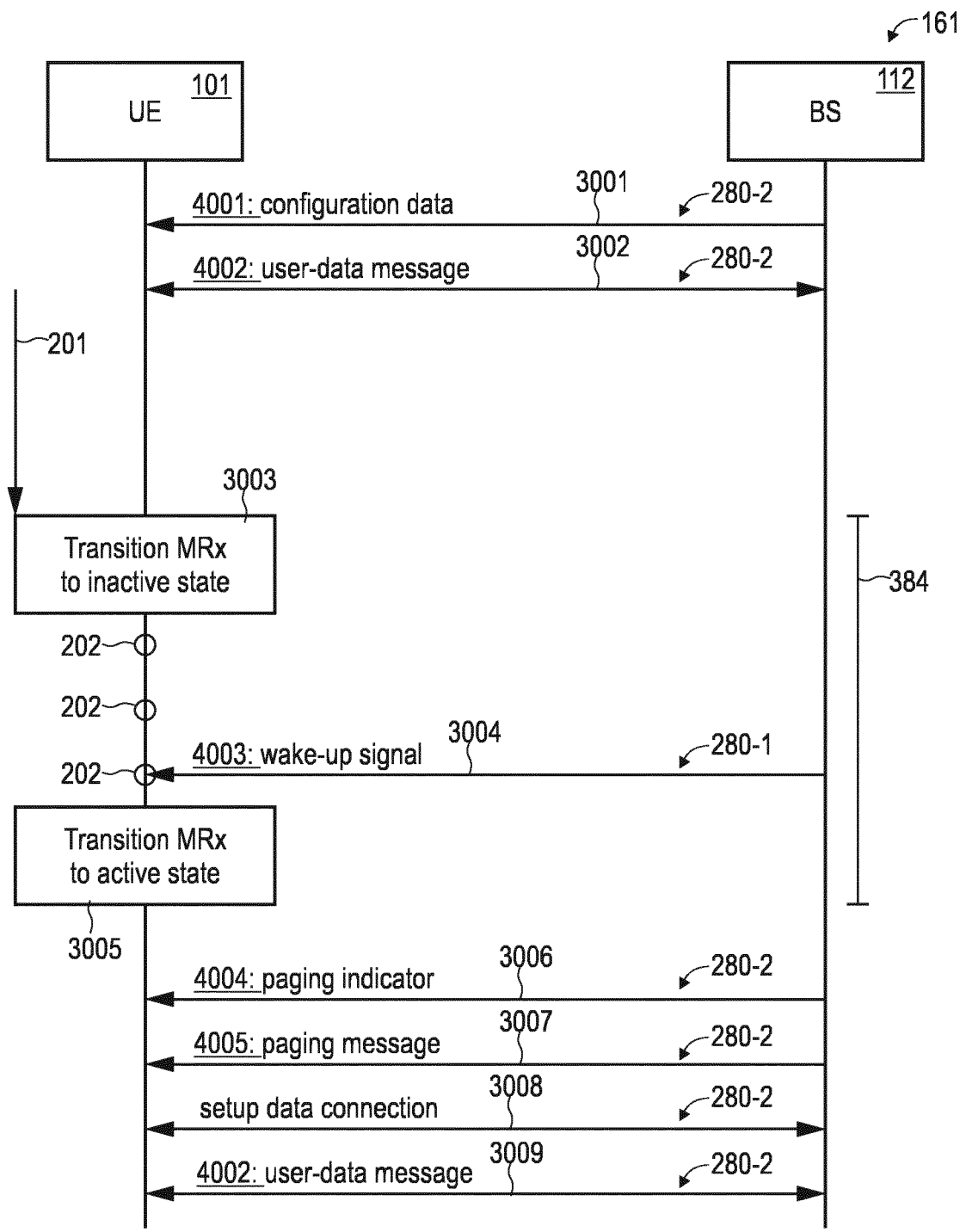
FIG. 10 is a signaling diagram of WUS transmission from a BS to a UE according to various examples.

FIG. 10 is a signaling diagram. FIG. 10 illustrates aspects with respect to communicating between the UE 101 and the BS 112. FIG. 10 relates to a scenario without UE mobility.

FIG. 10 illustrates aspects with respect to transmitting and/or receiving (communicating) a WUS 4003. According to the various examples described herein, such techniques as described with respect to FIG. 10 may be employed for communicating WUSs 4003. In particular, FIG. 10 also illustrates aspects with respect to the inter-relationship between communication of a WUS and communication of paging signals and messages 4004, 4005 that may be employed in the various examples described herein.

At 3001, configuration data 4001 is communicated. The configuration data 4001 is transmitted by the BS 112 and received by the UE 101, on a carrier 280-2. For example, a respective control message may be communicated on the channel 263, e.g., PDCCH. For example, the control message may be a Layer 2 or Layer 3 control message. The control message may be relate to RRC/higher-layer signaling. For example, the configuration data 4001 may be broadcasted, e.g., in a system information block.

The configuration data 4001 may be indicative of time-frequency resources used for the WUS transmission. Specifically, the configuration data 4001 may be indicative of a carrier 280-1 used for WUS transmission. For example, the configuration data 4001 may be indicative of the communication system used for the WUS transmission. The configuration data 4001 may provide guidance to the UE 101 on how to receive a WUS 4003, e.g., which frequency it is supposed to listen to and/or with which time interval it should listen, etc. For example, the configuration data 4001 may be indicative of the system identification registered to the communication system using transmission on the carrier 280-1.

Hence, the configuration data 4001 may be associated with the carrier 280-1. For example, the configuration data 4001 may include cryptographic keying material required for communicating on the carrier 280-1. The configuration data 4001 may be indicative of a frequency band occupied by the carrier 280-1 and/or a center frequency of the carrier 280-1. The configuration data 4001 may be indicative of the sequence design of WUS transmission used by the carrier 280-1. For example, the configuration data 4001 may be indicative of a modulation and/or coding scheme (MCS) of the WUS transmission. For example, the configuration data 4001 may be indicative of a length of the base sequence used for the WUS transmission in the. Thereby, it becomes possible to dynamically adjust the sequence design configuration for the WUS transmission, e.g., depending on the particular carrier 280-1 to be used for the WUS transmission.

At 3002, a payload signal, e.g., as part of a user-data message 4002 is communicated, as part of a data transmission. For example, the user-data message 4002 may be communicated on the payload channel 263. For example, the user-data message 4002 may be communicated along the data connection 189, e.g., as part of a bearer, etc.

4001 and 4002 are received by the main receiver 1351 of the UE 101f, on the carrier 280-2.

Then, there is no more data to be communicated between the UE 101 and the BS 112. Transmit buffers are empty. This may trigger a timer. For example, the timer may be implemented at the UE 101. After a certain timeout duration set in accordance with the inactivity schedule 201, the main receiver 1351 of the UE 101 is transitioned into the inactive state 384 from the active state, 3003. This is done in order to reduce the power consumption of the UE 101. For example, prior to the transitioning the main receiver 1351 to the inactive state 384, it would be possible to release the data connection 189 by appropriate control signaling on the control channel (not illustrated in FIG. 10). The timeout duration 201 is an example implementation of a trigger criterion for transitioning into the inactive state 384; other trigger criteria are possible. For example, a connection release message may be communicated.

Multiple wake-up occasions (WOs) 202 for communicating the WUS 4003 are then implemented by reoccurring resources elements 265 of the time-frequency resource grid 200 of the carrier 280-1 (cf. FIG. 2).

At some point in time, the BS 112 transmits a WUS 4003, 3004. The WUS 4003 is transmitted on the carrier 280-1. The WUS transmission is in accordance with the configuration data 4001.

The WUS 4003 may be transmitted, because there is DL data—e.g., payload data or control data—scheduled for transmission to the UE 101 in a transmit buffer.

In response to receiving the WUS 4003, the main receiver 1351 of the UE 101 is transitioned to the active state, 3005.

Then, at 3006, a paging indicator 4004 is transmitted by the BS 112 to the UE 101. The paging indicator 4004 is received by the main receiver 1351. For example, the paging indicator may be transmitted on channel 262, e.g. PDCCH.

For example, the paging indicator may include a temporary or static identity of the UE 101. The paging indicator or may be indicative of a plurality of UEs, because the indicator may be derived from unique identities of the UEs such as the International Mobile Subscriber Identity (IMSI) or the like in an ambiguous manner.

The paging indicator 4004 may include information on a MCS used for communicating a paging message 4005 at 3007. The paging message 4005 may be communicated on a shared channel 263, e.g., physical DL shared channel (PDSCH). Generally, the paging indicator 4004 and the paging message 4005 may be communicated on different channels. The paging message 4005 may be modulated and encoded according to the MCS indicated by the paging indicator 4004. Thus, it may be required that the UE 101 receives, firstly, the paging indicator 4004 and, secondly, the paging message 4005.

Then, at 3008, a data connection 189 is set up between the UE 101 and the BS 112. This may include a RA transmission.

Finally, a UL or DL payload signal, e.g., as part of a user-data message 4002 is communicated using the newly set up data connection 189 at 3009.

Figure 11:
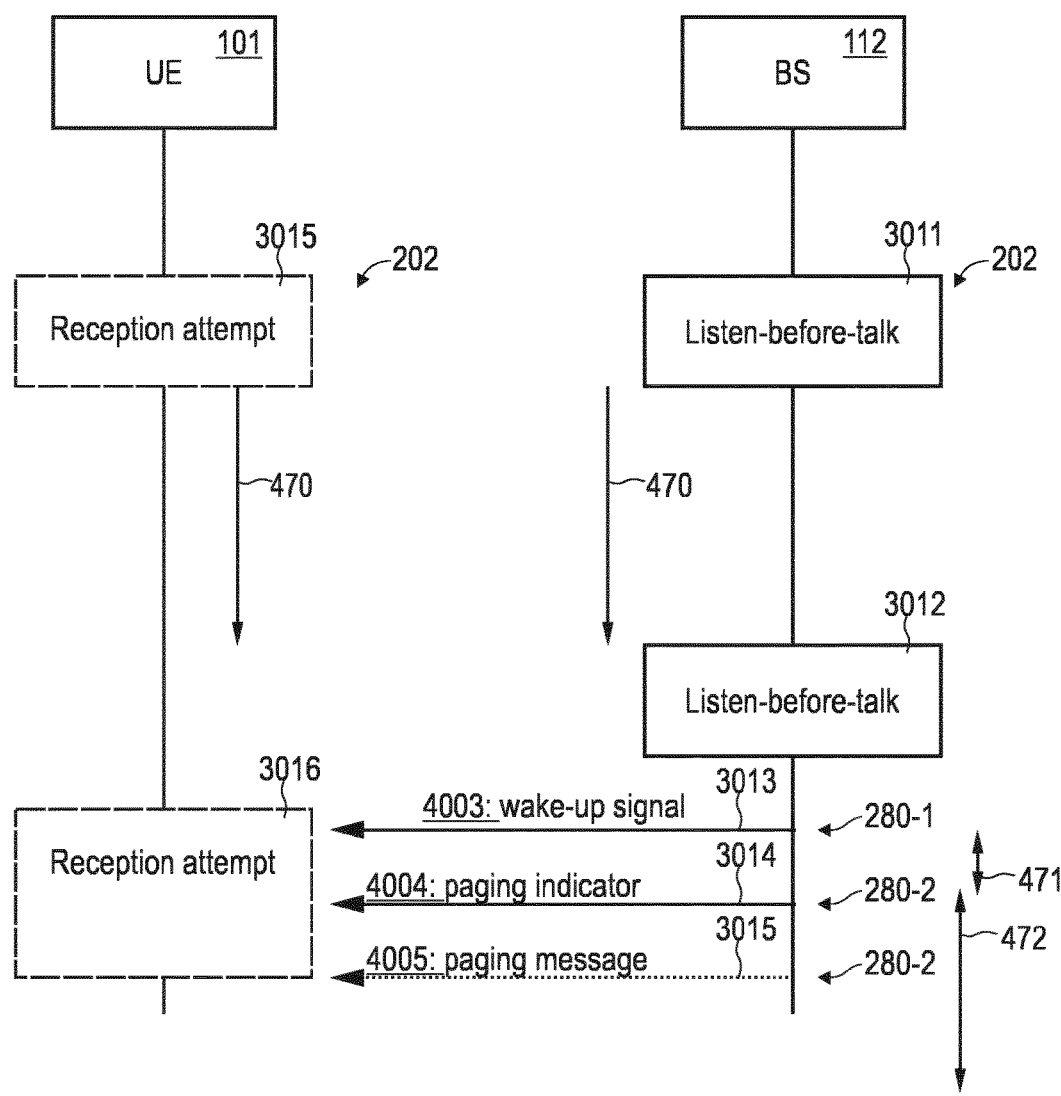
FIG. 11 is a signaling diagram of WUS transmission from a BS to a UE on an unlicensed spectrum according to various examples.

FIG. 11 illustrates aspects of accessing an unlicensed spectrum for wake-up and paging. For example, the technique of FIG. 11 may be employed in connection with the communication of the WUS 4003 and the paging signals 4004, 4005 of FIG. 10; this may be the case where the carrier 280-1 resides on an unlicensed spectrum.

At 3011—time-aligned with a WO 202—, the BS 112 implements a listen-before talk (LBT) procedure. In other words, the BS 112 attempts to access the unlicensed spectrum. Hence, a signal level may be sensed on frequency band occupied by the carrier 280-1 on the unlicensed spectrum. For example, if the signal level exceeds a threshold, a back-off 470 may be implemented.

At 3015, the UE 101 implements a reception attempt.

As illustrated in FIG. 11, the LBT procedure fails and the back-off 470 is activated. Then, at 3012 a further LBT procedure is implemented. At 3012, the LBT procedure succeeds and therefore the BS 112, at 3013, 3014, transmits the WUS 4003. The respective reception attempt at 3016 succeeds.

FIG. 11 also illustrates aspects with respect to access regulations of the unlicensed spectrum on which the carrier 280-1 resides. Specifically, FIG. 11 illustrates aspects with respect to a channel access interval 471 (sometimes also referred to as Maximum Channel Occupancy Time, MCOT). The MCOT 471 may limit the maximum time that any given device may continuously access the unlicensed spectrum. Typically, the beginning of the MCOT is defined by the start of transmitting on the unlicensed spectrum (in FIG. 11, at 3013); and the end of the channel access interval) is defined by a preset maximum time duration according to access regulations of the unlicensed spectrum, i.e., regulatory requirements. Typical durations of MCOTs can be in the range of 10 ms-1 s.

Another example access regulation includes a maximum channel access duty cycle (MCAD). The MCAD provides for an upper limit of the relation between talking duration on the unlicensed spectrum and quiet durations on the unlicensed spectrum, i.e., an upper limit for the relation between transmitting and idling.

Illustrated in FIG. 11 is a scenario in which transmission of the WUS 4003 and transmission of the paging signals 4004, 4005 at 3013-3015 cannot be completed within the MCOT 471. Hence, based on the MCAD, in conventional scenarios according to reference implementations, it would be required to implement a quiet time 472 after transmitting the WUS 4003 and before transmitting the paging signals 4004, 4005.

However, in the various techniques described herein, the WUS 4003 is transmitted on the carrier 280-1; and, in response to transmitting the WUS 4003, the paging signals 4004, 4005 are transmitted on the carrier 280-2. The carriers 280-1, 280-2 occupy different frequency bands, offset from each other in frequency domain. Hence, it is generally possible that the different frequency bands of the different carriers 280-1, 280-2 are subject to different access regulations—even if they are both situated on open spectra.

Then, in the scenario illustrated in FIG. 11—even though transmission of the WUS 4003 requires at least a significant portion of the MOOT 471—, by switching to the carrier 280-2 for transmission of the paging signals 4004, 4005, it is not required to implement the quiet time 472 to obey the MCAD of the access regulations subject to the unlicensed spectrum on which the carrier 280-1 is situated. This helps to reduce the latency required until finalizing the wake-up and the paging. At the same time, it becomes possible to offload the WUS transmission from the carrier 280-2 onto the carrier 280-1, thereby reducing the control signaling overhead on the communication system associated with the carrier 280-2.

As will be appreciated from FIG. 10 and FIG. 11, upon transitioning the main receiver 1351 to the active state at 3005, the data connection 189 needs to be re-established. For this reason, the UE 101 operates in idle mode—when no data connection 189 is set up or maintained—during the inactive state 384 of the main receiver 1351. However, in the various examples described herein, other implementations of the particular mode in which the UE 101 operates during the inactive state 384 are conceivable. Along with such varying implementations with respect to the operational mode of the UE 101 during the inactive state 384, it is also possible that other signals are transmitted in response to the WUS 4003. For example, because in FIG. 10 the data connection 189 is released at 3003, paging may be required to re-establish the data connection; in other scenarios, the data connection 189 may be kept established during the inactive state 384 and, hence, it may not be required to transmit a paging signal 4004, 4005. Different modes associated with the WUS 4003 are illustrated in FIG. 12.

Figure 12:
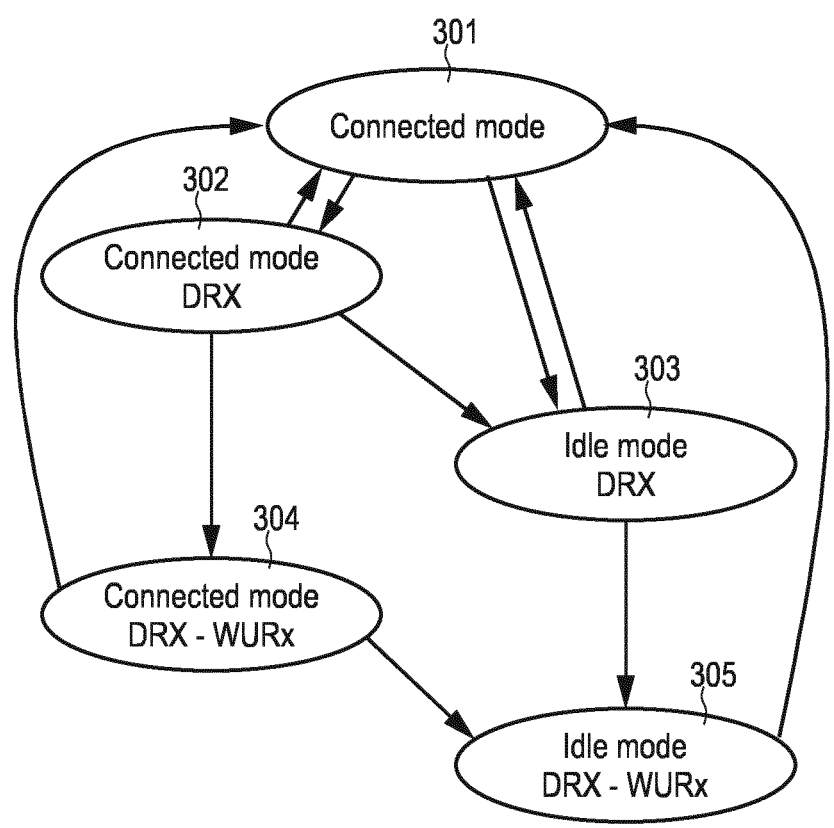
FIG. 12 schematically illustrates various operational modes of a UE according to various examples.

FIG. 12 illustrates aspects with respect to different modes 301-305 in which the UE 101 can operate. FIG. 12 also illustrates aspects with respect to association of communication of WUSs and paging signals with the various modes 301-305. In the various examples described herein, it is possible that the WUSs are communicated in certain operational modes 304, 305 of the UE 101.

Example implementations of the operational modes 301-305 are described, e.g., in 3GPP TS 38.300, e.g., version 15.0.

During connected mode 301, a data connection 189 is set up. For example, a default bearer and optionally one or more dedicated bearers may be set up between the UE 101 and the network 100. The main receiver of the UE 101 may persistently operate in an active state. In order to reduce the power consumption, it is then possible to transition from the connected mode 301 to a connected mode 302 which employs a DRX cycle of the main receiver 1351. The DRX cycle includes on durations and off durations. During the off durations, the main receiver 1351 is unfit to receive data; an inactive state may be activated. The timing of the DRX cycle is synchronized between the UE 101 and the BS 112 such that the BS 112 can align any DL transmission with the on durations of the connected mode DRX cycle. The bearer 189 is maintained set-up in mode 302.

To achieve a further power reduction, it is possible to implement an idle mode 303. The idle mode 303 is, again, associated with the DRX cycle of the main receiver 1351 of the UE 101. However, during the on durations of the DRX cycle in idle mode 303, the main receiver 1351 is only fit to receive paging indicators and, optionally, paging messages. For example, this may help to restrict the particular bandwidth that needs to be monitored by the main receiver 1351 during the on durations of the DRX cycles in idle mode 303. This may help to further reduce the power consumption—e.g., if compared to the connected mode 302.

In modes 301-303 the main receiver 1351 is operated in the active state. The low-power receiver 1352 is not required.

In the example of FIG. 12, two more modes 304, 305 are illustrated. Both modes 304, 305 relate to scenarios where the main receiver 1351 is operated in the inactive state 384. Hence, during the modes 304, 305, the main receiver 1351 is persistently switched off and, in particular, not switched on during any on durations. Differently, during the modes 304, 305, the low-power receiver 1352 is at least sometimes operating in an active state, e.g., according to a respective DRX cycle of the low power receiver 1352.

In mode 304—associated with communicating the WUS 4003—, the data connection 189 is maintained between the UE 101 and the network 100. For example, respective registry entries may be maintained by the UE 101 and the network 100, e.g., at a core-network mobility node such as the AMF 131. In mode 304, it would be possible that a further signal—which is communicated in response to communicating the WUS—is a payload signal encoding payload data, e.g., a user-data message 4002 associated with the data connection 189. Alternatively, in mode 304, it would be possible that a further signal—which is communicated in response to communicating the WUS—comprises DL scheduling control signal which is indicative of resource elements 265 or resource groups 266 of payload signals that encode payload data. While operating in mode 304, a RA transmission is not required.

Differently, in the mode 305, the data connection 189 is not maintained between the UE 101 and the network 100. A RA procedure, triggered by paging, may be required (cf. FIG. 10).

Figure 13:
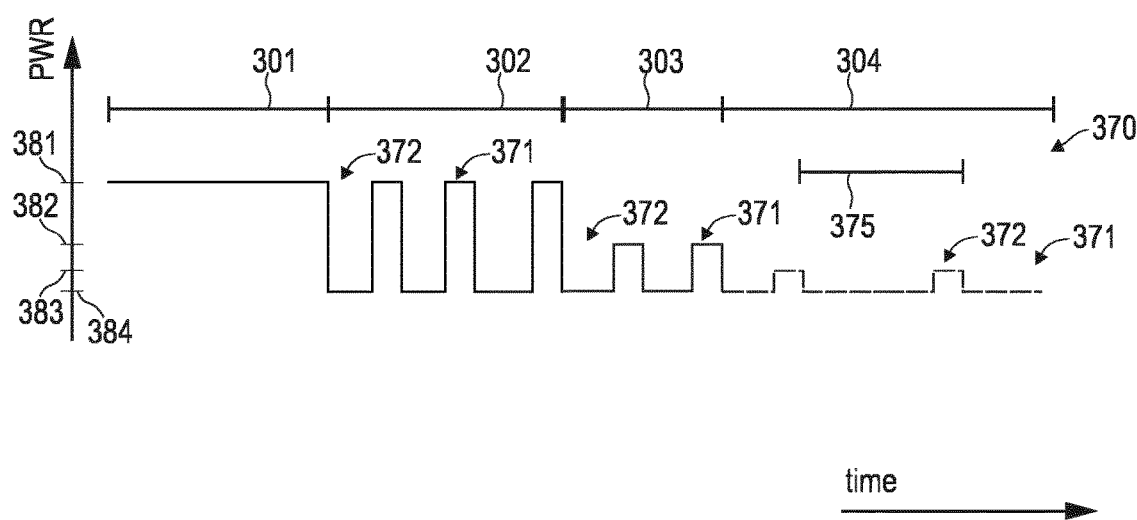
FIG. 13 schematically illustrates various states of a receiver of a UE according to various examples.

FIG. 13 illustrates aspects with respect to switching between the different modes 301-305. Furthermore, FIG. 13 illustrates aspects of employing DRX cycles 370. It is possible to employ such techniques in the various examples described herein with respect to communication of WUSs.

First, the UE 101 operates in the connected mode 301. This causes a persistent power consumption at a high level, because the main receiver 1351 persistently operates in the active state 381. The active state 381 is associated with a certain power consumption. Then, in order to reduce the power consumption, the connected mode 302 employing DRX is activated. Here, the on durations 371 and the off durations 372 of the main receiver 1351—selectively operating in the active state 381 and the inactive state 384—are illustrated.

To further reduce the power consumption, next, the idle mode 303 is activated. This is accompanied by releasing the data connection 189. Again, the idle mode 303 employs a DRX cycle including on durations 371 and off durations 372. The on durations 371 in mode 303 are associated with a lower power consumption if compared to the on durations 371 in connected mode 302, because in the idle mode 303, the capability of the main receiver 1351, now operating in the active state 382, can be reduced if compared to the connected mode 302. During idle mode 303 when in active state 382, the main receiver 1351 only expects reception of paging signals. The on durations 371 are aligned with POs.

Finally, to even further reduce the power consumption, the idle mode 305 is activated. Upon transitioning into the idle mode 305, the main receiver 1351 is persistently transitioned from the active states 381, 382 to the inactive state 384. A DRX cycle 370 is again implemented including on durations 371 and off durations 372 according to a DRX cycle length 375; here the on durations 371 are aligned with WOs. The DRX cycle is implemented by switching the low-power receiver 1352 between the active state 383 and the inactive state 384 (dashed line in FIG. 13).

For example, also mode 304 may rely on a DRX cycle (not illustrated in FIG. 13).

The various states 381-384 are examples only. For illustration, it would be possible that the main receiver is not transitioned into the fully inactive state 384 when in DRX connected mode 302; rather, in the OFF durations 372, an intermediate state between 381 and 384 could be assumed.

Figure 14:
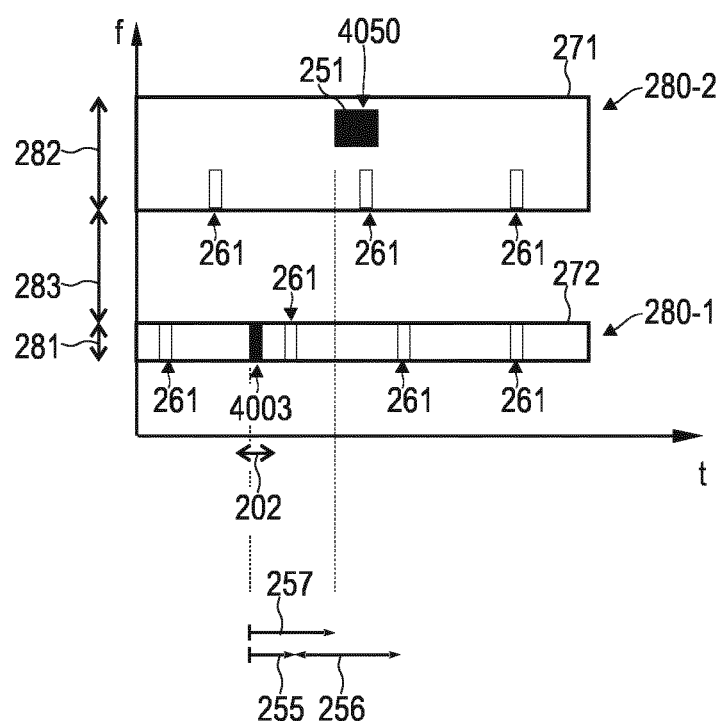
FIG. 14 schematically illustrates WUS transmission from a BS to a UE according to various examples.

FIG. 14 illustrates aspects with respect to the carriers 280-1, 280-2. As illustrated in FIG. 14, the carrier 280-1—used for communicating a WUS 4003—occupies a frequency band 281; while the carrier 280-2 occupies a frequency band 282. The frequency band 281 is offset from the frequency band 282 by a frequency gap 283.

For example, the bandwidth of the frequency band 281 may be smaller than the bandwidth of the frequency band 282. For example, a bandwidth of the frequency band 281 may not be larger than 20% of a bandwidth of the frequency band 282, optionally not be larger than 5% of the bandwidth of the frequency band 282, further optionally not be larger than 1% of the bandwidth of the frequency band 282. For example, a bandwidth of the frequency band 280 180 can be in the range of 1 MHz-50 MHz. By using a comparably narrow bandwidth for the frequency band 281 of the carrier 280-1, it becomes possible to flexibly fit the carrier 280-1 into an unlicensed spectrum. This increases the flexibility with respect to communicating the WUS 4003.

For example, the frequency gap 283 may be larger than a bandwidth of the frequency band 282. By dimensioning the frequency gap 283 to be comparably large, it is possible to flexibly offset the carriers 280-1, 280-2 in frequency domain (vertical axis in FIG. 14).

The carrier 280-1 may be associated with a different communication system than the carrier 280-2. For example, the communication system associated with the carrier 280-1 may use a different system identification; by means of the system identification, the UE 101 attempting to receive a WUS 4003 can ensure it listens to the appropriate wake-up system. For this, the frequency band 280-1 associated with the communication system of the carrier 280-1 is stored at the UE 101. For example, such information may be provided as part of the configuration data 4001 (cf. FIG. 10).

As a general rule, due to the frequency gap 283, the carriers 280-1, 280-2 may be subject to different access regulations. For example, it would be possible that both carriers 280-1, 280-2 reside on open spectra. Then, a situation may be encountered in which the MCAD for the carrier 280-1 is smaller than for the carrier 280-2. This may be tolerable, because the WUS transmission on the carrier 280-1 may be comparably short, e.g., if compared to payload data transmission on the carrier 280-2.

As a general rule, the carriers 280-1, 280-2 may operate largely independent from each other. Specifically, it would be possible that the carriers 280-1, 280-2 employ different timing references and/or employ different frequency references. Hence, for communicating on the carrier 280-1, it may be required to employ a first timing reference associated with the carrier 280-1 based on synchronization signals communicated on the carrier 280-1; and for communicating on the carrier 280-2, it may be required to acquire a second timing reference associated with the carrier 280-2 based on second synchronization signals communicated on the carrier 280-2. For example, the UE 101 may, first, receive a synchronization signal on the channel 261 of the carrier 280-1, to thereby acquire the timing reference of the carrier 280-1. Then, the UE 101 can receive the WUS 4003, based on this acquired timing reference, at the WO 202.

The channel 261 of the carrier 280-1 may also include reference signals for channel sensing, e.g., as part of mobility measurements. As a general rule, various control signals may be communicated on the carrier 280-1, e.g., synchronization signals and/or reference signals for channel sensing, etc.

In response to communicating the WUS 4003, a further signal 4050 is communicated on the carrier 280-2. For this, respective resources 251 are allocated on a respective channel of the carrier 280-2.

In the various scenarios described herein, it is possible that different types of signals 4050 are communicated on the carrier 280-2 in response to communicating the WUS 4003 on the carrier 280-1. In a first option, the further signal 4050 may be implemented by a paging signal 4004, 4005 (cf. FIG. 11). Such a scenario may be, in particular, applicable where the UE 101 is operated in the idle mode 305 when communicating the WUS 4003.

In a second option, paging can be skipped. Here, the further signal 4050 may be implemented by an UL RA preamble of a RA transmission. Here, the UE 101 may directly attempt to transition from idle mode 305 to connected mode 301, by transmitting the UL RA preamble. Such a scenario may be, in particular, applicable where the UE 101 is operated in idle mode 305 when communicating the WUS 4003.

In a third option, the further signal 4050 can be implemented by a payload signal encoding payload data. Such a scenario may be applicable where the UE 101 is operated in connected mode 304 when communicating the WUS 4003. Since it is not required to set up the data connection 189, both, paging, as well as the RA transmission can be skipped.

In a fourth option, the further signal 4050 can be implemented by a DL scheduling control signal. The DL scheduling control signal, in turn, can be indicative of time-frequency resources of a payload signal which encodes payload data. Also such a scenario may be applicable where the UE 101 is operated in connected mode 304 when communicating the WUS 4003.

Generally, the WUS 4003 may include a pointer towards the further signal 4050. As such, the WUS 4003 may direct the activity of the UE 101—e.g., of the main receiver 1351—towards receiving of the further signal 4050. There are different scenarios conceivable to implement such a pointer towards the further signal 4050. For example, it would be possible that the WUS 4003 is indicative of a timing of the further signal 4050.

In a first option, a time-window approach can be used. Here, the WUS 4003 is indicative of a timing which defines a time window 256. The WUS 4003 may include an information field which encodes a value associated with the time window. For example, the WUS 4003 can include a pointer, e.g., comprise a timer value or the like. It would also be possible that the WUS 4003 itself implements pointer functionality, e.g., by having a default timing linked to the WUS 4003. For example, different types of WUSs 4003 or different resources used for communicating a WUS 4003 could correspond to different timings. As such, the WUS 4003 may generally be implicitly or explicitly indicative of the timing. The time window 256 can include the communication of the further signal 4050, or in other words be used for communication of the further signal 4050. Specifically, in such a time-window approach it may not be required to unambiguously identify the particular resource elements 265 of the carrier 280-2 allocated to the communication of the further signal 4050. Rather, it is possible to identify, in time domain, upper and lower boundaries of the time window 256, in-between which boundaries the further signal 4050 can be expected. Then, the UE 101 can listen for the further signal 4050 throughout the time window 256, e.g., using the main receiver 1351. By provisioning the time window 256 with a certain offset 255 with respect to the communication of the WUS 4003, there may be sufficient time available to activate the main receiver 1351.

Such an approach may be advantageous where the two communication systems associated with the carriers 280-1, 280-2 are not tightly coupled in time domain, e.g., do not use the same timing reference. Then, tolerances between the timing references of the carriers 280-1, 280-2 can be taken into account by appropriately dimensioning the time window 256, e.g., by providing a certain headroom at its start and end in view of these tolerances.

There are different strategies available for defining the time window 256. In one option, a timer may be implemented at the UE 101, wherein the timer is initialized based on corresponding control information provided by the WUS 4003. Then, a local clock of the UE 101 may be used to identify the start and end of the time window 256. In a further option, it would be possible to define the time window 256 with respect to the timing reference of the carrier 280-2. Here, it would be possible, e.g., to specify the time window 256 in terms of one or more sequence numbers of transmission frames 267 used by the carrier 280-2. Then, once the UE 101 has synchronized with the carrier 280-2 based on respective synchronization signals, the UE 101 can identify the current sequence number and then control the receiver activity correspondingly.

Alternatively or additionally to such a time-window approach, it would be possible that the WUS 4003 is indicative of more direct information of the resources 251 used for communicating the further signal 4050. For example, an offset time duration 257 between communicating the WUS 4003 and the start of the resources 251 could be indicated. Alternatively or additionally, it would be possible to indicate the resources 251 by using a scheduling format associated with the carrier 280-2. For example, reference could be made to the time-frequency resource grid 200 used by the carrier 280-2. As such, the WUS may not only be indicative of a timing of the further signal 4050, but also the frequency of the further signal 4050. Here, the frequency and timing of the further signal 4050 may define the resource elements 265 or resource groups 266 of the resource grid 200 used by the carrier 280-2 and allocated to the further signal 450. Such a scenario may be specifically applicable where the UE operates in the connected mode 304 (cf. FIG. 12); here, it may not be required to, first, implement paging and/or a RA transmission to set up the data connection 189. Rather, communication of a scheduling control signal or even a payload signal encoding payload data can commence directly. Even if the UE operates in mode 305—i.e., a RA transmission is required to set up the data connection 189—, it would be possible to provide direct information on when in time domain and where in frequency domain resources 251 are allocated for an UL RA preamble of the RA transmission. Paging can be skipped.

Figure 15:
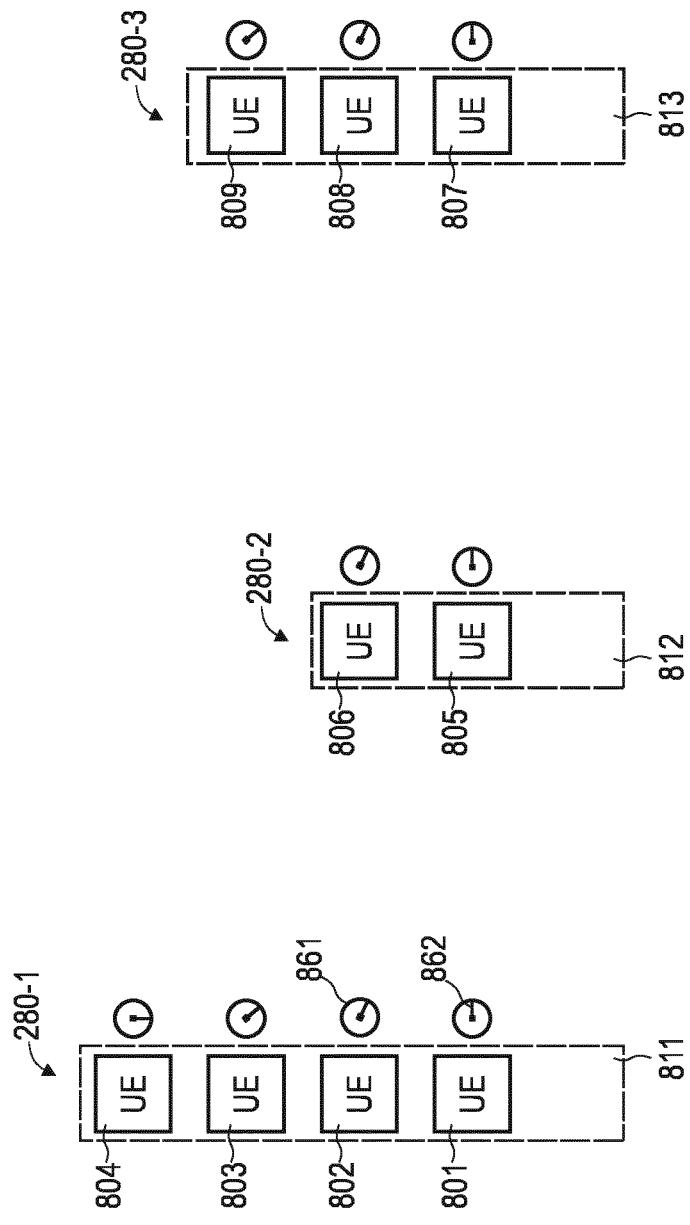
FIG. 15 schematically illustrates allocation of UEs to various carriers for WUS transmission according to various examples.

FIG. 15 illustrates aspects with respect to allocating UEs 801-809 to different communication systems and, thereby, different carriers 280-1, 280-2, 280-3. A group 811 including the UEs 801-804 is located to WUS transmission on a narrowband carrier 280-1. A group 812 of UEs 805-806 is allocated to WUS transmission on the carrier 280-2; this is the main, broadband carrier 280-2 also used for data transmission (cf. FIG. 14). A group 813 including UEs 807-809 is allocated to WUS transmission on a further narrowband carrier 280-3. The different carriers 280-1-280-3 occupy frequency bands offset from each other in frequency domain.

All UEs 801-809 are allocated to the carrier 280-2 for a payload data transmission.

By flexibly offloading UEs 801-804, 807-809 from the main carrier 280-2, it becomes possible to reduce the control signaling overhead on the main carrier 280-2. At the same time, ambiguities between wake-up identities 862 due to a size-limited wake-up identity space 861 can be avoided.

FIG. 15 also illustrates aspects with respect to wake-up identities 862. Wake-up identities 862 are used for UE-selective wake-up. A WUS 4003 can be indicative of a wake-up identity 862; then, a UE 801-809 can compare the indicated wake-up identity 862 with its own wake-up identity; depending on this comparison, the UE 801-809 may wake-up or not wake-up. For example, the configuration data 4001—if communicated on a one-to-one communication—can be indicative of the wake-up identity 862 allocated to a given UE 801-809.

The wake-up identities, in the scenario FIG. 15, are unique within each group 811-813. However, the wake-up identities are not unique across the different groups 811-813: For example, the UEs 801, 805, 807 all share the same wake-up identity 862.

Due to allocation of the UEs 801, 805, 807 to different groups 811-813, associated with WUS transmission on different carriers 280-1-280-3, ambiguities can be avoided. At the same time, this re-use of wake-up identities across different groups 811-813, enables to reduce the size of the wake-up identity space 861. Thereby, duration of the WUSs can be reduced, saving control signaling overhead and facilitating robust communication.

According to various examples, it would be possible that the network 100 maintains a registry indicative of allocations between the UEs 801-809 and the respective carriers 280-1-280-3 for WUS transmission. This helps to resolve such ambiguities in wake-up identities, etc.

Figure 16:
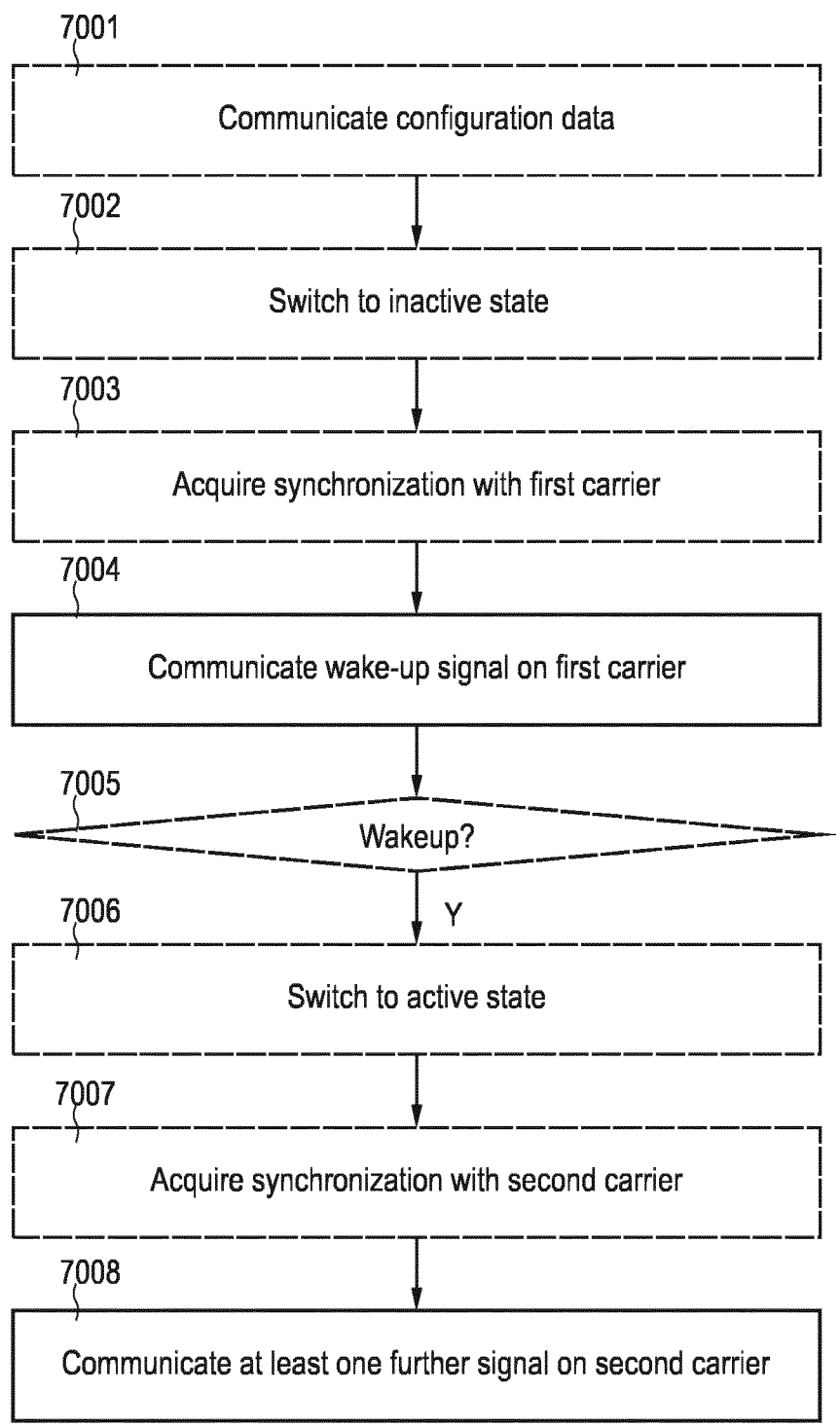
FIG. 16 is a flowchart of a method according to various examples.

FIG. 16 is a flowchart of a method according to various examples. In FIG. 16, optional blocks are illustrated with dashed lines. For example, the method of FIG. 16 may be executed by the control circuitry 1122, 1123 of the BS 112; and/or may be executed by the control circuitry 1012, 1013 of a UE 101, 801-809.

At optional block 7001, configuration data is communicated. For this, one or more control messages may be communicated between, e.g., the BS and the UE. This may include communication of one or more UL control messages and/or communication of one or more DL control messages. An example implementation as illustrated in FIG. 10: at 3001. The configuration data can be indicative of a wake-up identity allocated to the UE. Alternatively or additionally, the configuration data can be associated with a first carrier for the WUS transmission. For example, the configuration data can be indicative of a system identification registered to transmission on the first carrier for the WUS transmission. For example, the configuration data can be indicative of a center frequency and/or frequency bandwidth of the first carrier for the WUS transmission.

The configuration data itself can be communicated on a second carrier, different from the first carrier, and offset in frequency domain. For example, the configuration data can be broadcasted or communicated on a one-to-one communication.

Then, at optional block 7002, a receiver of the UE is switched to an inactive state (cf. FIG. 13). This may or may not go along with transitioning the UE into an idle mode by releasing a data connection (cf. FIG. 12).

Next, at optional block 7003, synchronization with the first carrier is acquired. For this, the receiver can maintain an inactive state; e.g., a wake-up receiver may be used or a wake-up receiver functionality of the main receiver may be used. At block 7003, one or more synchronization signals communicated on the first carrier are received. A timing reference of the first carrier is thereby acquired.

Based on this timing reference, next, at block 7004, a WUS is communicated on the first carrier. This maybe time-aligned with a WO, e.g., with respect to a DRX cycle implemented by the UE.

At optional block 7005, it is checked whether a wake-up should be performed. For example, this may include comparing a wake-up identity indicated by the WUS of block 7004 with a stored wake-up identity previously allocated to the UE, e.g., by means of the configuration data of block 7001. In other examples, it would be possible to always wake-up when receiving a valid WUS. Here, the same WUS may be received for any UE able to receive on the respective first carrier.

Next, at optional block 7006, the receiver is switched to an active state.

Then, at optional block 7007 synchronization with the second carriers acquired, e.g., by receiving one or more synchronization signals on the second carrier.

At block 7008, one or more further signals are communicated on the second carrier. For example, one or more of the following signals could be communicated: a paging signals such as a paging indicator or a paging message; an UL RA preamble of a RA transmission; a payload signal encoding payload data; and a DL scheduling control signal indicative of time-frequency resources of a payload signal encoding payload data. At 7008, the one or more further signals are communicated in response to communicating the WUS at block 7004. The particular type of signal may depend on the mode in which the UE is operated when communicating the WUS at block 7004.

For example, if the UE is operated in idle mode, then there may be a need to communicate a paging signal and/or implement a RA transmission to set up a data connection. However, if the UE is operated in connected mode, it may be possible to proceed directly to communicating the DL scheduling control signal or even the payload signal.

Figure 17:
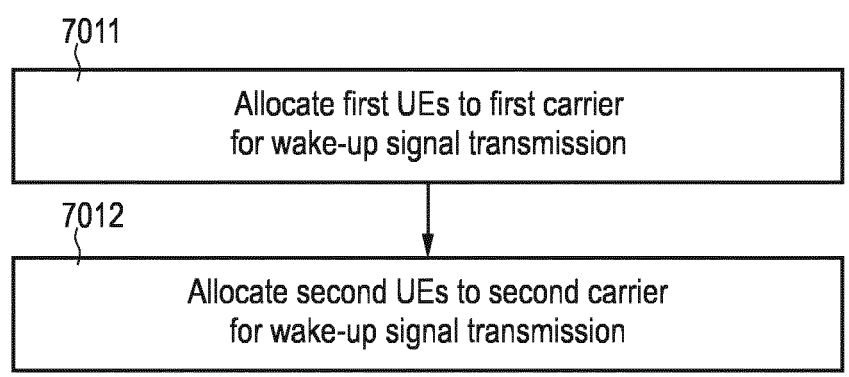
FIG. 17 is a flowchart of a method according to various examples.

FIG. 17 is a flowchart of a method according to various examples. For example, the method of FIG. 17 may be implemented by a node of the network 100 according to FIG. 1, e.g., by a BS 112 for the AMF 131.

At block 7011, a first plurality of UEs is allocated to WUS transmission on a first carrier. E.g., a group of UEs may be allocated to the WUS transmission on the first carrier.

At block 7012, a second plurality of UEs is allocated to a WUS transmission on a second carrier. E.g., a further group of UEs may be allocated to the WUS transmission on the second carrier.

For example, the first and second plurality of UEs may re-use wake-up identities. They may share the same wake-up identity space. A registry may be maintained which is indicative of the allocations of blocks 7011 and 7012, to resolve any ambiguities between re-used wake-up identities.

For example, the first plurality of UEs and the second plurality of UEs may be associated with different WUS sequence designs. For example, for the first plurality of UEs, a different base sequence, a different scrambling and/or spreading, a different checksum and/or preamble may be used if compared to the second plurality of UEs (cf. FIG. 8 and FIG. 9). Thereby, the sequence design can be tailored to the particular carrier, e.g., the particular frequency range, path loss, access regulations, etc., experienced for the respective carrier.

Summarizing, techniques have been described which enable to implement separate carriers—and therefore separate communication systems—for WUS transmission. For example, separate carriers may be used for WUS transmission and payload data transmission. Alternatively or additionally, separate carriers may be used for WUS transmission associated with different UEs.

Each communication system and carrier may have its own system information and timing. Different techniques have been described which implement wake-up of the UE using WUS transmission implemented on a dedicated carrier.

For example, the different carriers may subject to different access regulations, e.g., because some of the carriers reside in an unlicensed spectrum or different carriers reside in different unlicensed spectrum subject to different access regulations.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various techniques have been described in which communication on multiple carriers is supported by a single BS. In other examples, the different carriers—e.g., used for WUS transmission and payload data transmission—may be hosted by multiple BSs.

The invention claimed is:

1. A method of operating an access node, the method comprising:
   communicating, from the access node of a network and to a terminal, a wake-up signal on a first carrier occupying a first frequency band; and
   in response to communicating the wake-up signal:
      communicating by the access node at least one further signal on a second carrier occupying a second frequency band, wherein the at least one further signal comprises an uplink random access preamble of a random access transmission,
   wherein the first frequency band is offset in frequency domain from the second frequency band,
   wherein the wake-up signal comprises a pointer towards the at least one further signal,
   wherein the pointer directs activity of the terminal towards receiving the at least one further signal.

2. The method of claim 1, wherein:
the first frequency band is subject to first access regulations; and
the second frequency band is subject to second access regulation different from the first access regulations.

3. The method of claim 2, wherein:
the first access regulations comprise a first maximum channel access duty cycle;
the second access regulations comprise a second maximum channel access duty cycle; and
the first maximum channel access duty cycle is smaller than the second maximum channel access duty cycle.

4. The method of claim 1, wherein:
the first carrier operates using a first timing reference; and
the second carrier operates using a second timing reference different from the first timing reference.

5. The method of claim 1, wherein the pointer directs the activity of the terminal to time-frequency resources of a resource grid defined by the second carrier and allocated to the at least one further signal.

6. The method of claim 1, wherein the pointer directs the activity of the terminal to a time window for the terminal to receive the at least one further signal.

7. The method of claim 1, wherein the at least one further signal comprises a paging signal.

8. The method of claim 1, wherein the at least one further signal comprises a payload signal encoding payload data.

9. The method of claim 8, wherein the terminal is operated in a connected mode, when communicating the wake-up signal.

10. The method of claim 1, wherein the at least one further signal comprises a downlink scheduling control signal indicative of time-frequency resources of a payload signal encoding payload data.

11. The method of claim 1, further comprising:
communicating, between the access node and the terminal, configuration data associated with the first carrier using at least one of a one-to-one transmission and a broadcast transmission on the second carrier.

12. The method of claim 11, wherein the configuration data is indicative of a system identification registered to transmission on the first carrier.

13. The method of claim 1, further comprising:
communicating, from the access node and to the terminal, at least one further control signal on the first carrier, the at least one further control signal being at least one of a channel reference signal and a synchronization signal.

14. The method according to claim 1, further comprising:
communicating a wake-up signal on the second carrier from the access node of the network to a second terminal.

15. The method of claim 1, wherein the wake-up signal comprises control information that initializes a timer of the terminal.

16. The method of claim 1, wherein the wake-up signal is indicative of a timing that defines a time window.

17. The method of claim 16, wherein the timing defines the time window in terms of one or more sequence numbers of transmission frames used by the second carrier.

18. A method of operating an access node, the method comprising:
communicating, from the access node of a network and to a terminal, a wake-up signal on a first carrier occupying a first frequency band;
in response to communicating the wake-up signal:
communicating by the access node at least one further signal on a second carrier occupying a second frequency band; and
communicating, between the access node and the terminal and on the second carrier, a wake-up identity selected from a set of wake-up identities allocated to wake-up transmission on the first carrier, wherein the wake-up signal is indicative of the wake-up identity,
wherein the first frequency band is offset in frequency domain from the second frequency band,
wherein the wake-up signal comprises a pointer towards the at least one further signal,
wherein the pointer directs activity of the terminal towards receiving the at least one further signal.

19. A method of operating an access node, the method comprising:
communicating, from the access node of a network and to a terminal, a wake-up signal on a first carrier occupying a first frequency band;
in response to communicating the wake-up signal:
communicating by the access node at least one further signal on a second carrier occupying a second frequency band; and
maintaining a registry indicative of allocations between terminals and carriers for wake-up signal transmission,
wherein the first frequency band is offset in frequency domain from the second frequency band,
wherein the wake-up signal comprises a pointer towards the at least one further signal,
wherein the pointer directs activity of the terminal towards receiving the at least one further signal.

20. A method, comprising:
allocating a first plurality of terminals to wake-up signal transmission on a first carrier; and
allocating a second plurality of terminals to wake-up signal transmission on a second carrier,
wherein a first frequency band occupied by the first carrier is offset in frequency domain from a second frequency band occupied by the second carrier.

21. The method of claim 20, further comprising:
allocating the first plurality of terminals and the second plurality of terminals to payload data transmission on the second carrier.

* * * * *